United States Patent
Kapa, Jr.

(10) Patent No.: US 9,066,156 B2
(45) Date of Patent: Jun. 23, 2015

(54) TELEVISION RECEIVER ENHANCEMENT FEATURES

(71) Applicant: EchoStar Technologies L.L.C., Englewood, CO (US)

(72) Inventor: Milton Kapa, Jr., Tucker, GA (US)

(73) Assignee: Echostar Technologies L.L.C., Englewood, CO (US)

( * ) Notice: Subject to any disclaimer, the term of this patent is extended or adjusted under 35 U.S.C. 154(b) by 8 days.

(21) Appl. No.: 13/971,579

(22) Filed: Aug. 20, 2013

(65) Prior Publication Data

US 2015/0058890 A1 Feb. 26, 2015

(51) Int. Cl.
| | |
|---|---|
| *H04H 60/33* | (2008.01) |
| *H04N 21/81* | (2011.01) |
| *H04N 21/235* | (2011.01) |
| *H04N 21/258* | (2011.01) |
| *H04N 21/418* | (2011.01) |
| *H04N 21/41* | (2011.01) |
| *H04N 21/472* | (2011.01) |
| *H04N 21/482* | (2011.01) |
| *H04N 21/45* | (2011.01) |
| *H04N 21/442* | (2011.01) |
| *H04N 21/47* | (2011.01) |

(52) U.S. Cl.
CPC ......... *H04N 21/8133* (2013.01); *H04N 21/235* (2013.01); *H04N 21/25891* (2013.01); *H04N 21/4181* (2013.01); *H04N 21/4135* (2013.01); *H04N 21/47217* (2013.01); *H04N 21/4821* (2013.01); *H04N 21/4532* (2013.01); *H04N 21/44213* (2013.01); *H04N 21/47* (2013.01)

(58) Field of Classification Search
CPC ................... H04N 21/44204; H04N 21/4756; H04N 21/4826; H04N 21/44222; H04N 21/44213; H04N 21/4532; H04N 21/47
See application file for complete search history.

(56) References Cited

U.S. PATENT DOCUMENTS

| | | | |
|---|---|---|---|
| 6,005,562 A * | 12/1999 | Shiga et al. .................. | 715/721 |
| 6,177,931 B1 | 1/2001 | Alexander et al. | |
| 6,681,396 B1 * | 1/2004 | Bates et al. .................. | 725/58 |
| 7,633,887 B2 | 12/2009 | Panwar et al. | |
| 7,680,894 B2 | 3/2010 | Diot et al. | |
| 7,774,811 B2 | 8/2010 | Poslinski et al. | |
| 7,818,368 B2 | 10/2010 | Yang et al. | |
| 7,825,989 B1 | 11/2010 | Greenberg | |
| 7,849,487 B1 | 12/2010 | Vosseller | |

(Continued)

FOREIGN PATENT DOCUMENTS

| | | | |
|---|---|---|---|
| EP | 2 309 733 B1 | 4/2011 | |
| KR | 2004 0025073 A | 3/2004 | |

(Continued)

OTHER PUBLICATIONS

Extended European Search Report for EP 14160140.1, 7 pages.

(Continued)

*Primary Examiner* — Pankaj Kumar
*Assistant Examiner* — Timothy Newlin
(74) *Attorney, Agent, or Firm* — Kilpatrick Townsend & Stockton LLP

(57) ABSTRACT

One or more of a system, method, apparatus, and computer-program product to enable implementation of one or more features that together or separately enhance Quality of Experience or Quality of Service as a particular user interacts with a television receiver.

11 Claims, 7 Drawing Sheets

(56) References Cited

U.S. PATENT DOCUMENTS

| | | | |
|---|---|---|---|
| 8,079,052 B2 | 12/2011 | Chen et al. | |
| 8,104,065 B2 | 1/2012 | Aaby et al. | |
| 8,296,797 B2* | 10/2012 | Olstad et al. | 725/41 |
| 8,689,258 B2 | 4/2014 | Kemp | |
| 2001/0013123 A1 | 8/2001 | Freeman et al. | |
| 2002/0075402 A1 | 6/2002 | Robson et al. | |
| 2002/0178444 A1 | 11/2002 | Trajkovic et al. | |
| 2003/0118014 A1 | 6/2003 | Iyer et al. | |
| 2003/0126605 A1 | 7/2003 | Betz et al. | |
| 2003/0126606 A1* | 7/2003 | Buczak et al. | 725/46 |
| 2003/0188317 A1 | 10/2003 | Liew et al. | |
| 2003/0208763 A1 | 11/2003 | McElhatten et al. | |
| 2005/0071865 A1* | 3/2005 | Martins | 725/10 |
| 2005/0125302 A1* | 6/2005 | Brown et al. | 705/26 |
| 2005/0166230 A1 | 7/2005 | Gaydou et al. | |
| 2005/0240961 A1 | 10/2005 | Jerding et al. | |
| 2006/0020962 A1 | 1/2006 | Stark et al. | |
| 2006/0174277 A1* | 8/2006 | Sezan et al. | 725/46 |
| 2006/0190615 A1 | 8/2006 | Panwar et al. | |
| 2006/0238656 A1 | 10/2006 | Chen et al. | |
| 2006/0282869 A1 | 12/2006 | Plourde, Jr. | |
| 2007/0033616 A1* | 2/2007 | Gutta | 725/58 |
| 2007/0083901 A1 | 4/2007 | Bond | |
| 2007/0127894 A1* | 6/2007 | Ando et al. | 386/125 |
| 2007/0146554 A1 | 6/2007 | Strickland et al. | |
| 2007/0154169 A1* | 7/2007 | Cordray et al. | 386/83 |
| 2007/0157249 A1* | 7/2007 | Cordray et al. | 725/58 |
| 2007/0157253 A1 | 7/2007 | Ellis et al. | |
| 2007/0226766 A1 | 9/2007 | Poslinski et al. | |
| 2007/0245379 A1* | 10/2007 | Agnihortri | 725/46 |
| 2008/0022012 A1 | 1/2008 | Wang | |
| 2008/0086743 A1 | 4/2008 | Cheng et al. | |
| 2008/0097949 A1* | 4/2008 | Kelly et al. | 706/52 |
| 2008/0109307 A1 | 5/2008 | Ullah | |
| 2008/0195457 A1 | 8/2008 | Sherman et al. | |
| 2008/0235348 A1* | 9/2008 | Dasgupta | 709/218 |
| 2008/0300982 A1 | 12/2008 | Larson et al. | |
| 2008/0320523 A1 | 12/2008 | Morris et al. | |
| 2009/0055385 A1* | 2/2009 | Jeon et al. | 707/5 |
| 2009/0234828 A1* | 9/2009 | Tu | 707/5 |
| 2009/0299824 A1* | 12/2009 | Barnes, Jr. | 705/10 |
| 2010/0158479 A1 | 6/2010 | Craner | |
| 2010/0166389 A1* | 7/2010 | Knee et al. | 386/95 |
| 2010/0251295 A1* | 9/2010 | Amento et al. | 725/38 |
| 2010/0262986 A1* | 10/2010 | Adimatyam et al. | 725/9 |
| 2010/0269144 A1* | 10/2010 | Forsman et al. | 725/92 |
| 2010/0319019 A1 | 12/2010 | Zazza | |
| 2011/0072448 A1* | 3/2011 | Stiers et al. | 725/10 |
| 2011/0109801 A1 | 5/2011 | Thomas et al. | |
| 2011/0239249 A1 | 9/2011 | Murison et al. | |
| 2011/0286721 A1 | 11/2011 | Craner | |
| 2012/0060178 A1* | 3/2012 | Minakuchi et al. | 725/25 |
| 2012/0106932 A1 | 5/2012 | Grevers, Jr. | |
| 2012/0131613 A1 | 5/2012 | Ellis et al. | |
| 2012/0185895 A1 | 7/2012 | Wong et al. | |
| 2012/0230651 A1 | 9/2012 | Chen | |
| 2012/0246672 A1 | 9/2012 | Sridhar et al. | |
| 2012/0311633 A1* | 12/2012 | Mandrekar et al. | 725/40 |
| 2013/0014159 A1 | 1/2013 | Wiser et al. | |
| 2013/0174196 A1 | 7/2013 | Herlein | |
| 2014/0068675 A1 | 3/2014 | Mountain | |
| 2014/0123160 A1 | 5/2014 | van Coppenolle et al. | |
| 2014/0282714 A1 | 9/2014 | Hussain | |
| 2014/0331260 A1 | 11/2014 | Gratton | |
| 2014/0373079 A1 | 12/2014 | Friedrich et al. | |

FOREIGN PATENT DOCUMENTS

| | | | |
|---|---|---|---|
| KR | 2006 0128295 A | 12/2006 | |
| WO | 98/37694 A1 | 8/1998 | |
| WO | 2007/064897 A2 | 6/2007 | |
| WO | 2007/098067 A1 | 8/2007 | |
| WO | 2009/073925 A1 | 6/2009 | |
| WO | 2014/179017 A1 | 11/2014 | |

OTHER PUBLICATIONS

U.S. Appl. No. 13/942,451, filed Jul. 15, 2013 Non Final Office Action mailed Jul. 28, 2014, 27 pages.
U.S. Appl. No. 13/919,702, filed Jun. 17, 2013 Non Final Office Action mailed Jun. 11, 2014, 25 pages.
Extended European Search Report for EP 11166892.7 dated Oct. 6, 2011, 7 pages.
International Search Report and Written Opinion of PCT/US2014/033796 mailed Sep. 5, 2014, 12 pages.
U.S. Appl. No. 14/200,864, filed Mar. 7, 2014, Non-Final Office Action mailed Dec. 5, 2014, 35 pages.
U.S. Appl. No. 14/095,860, filed Dec. 3, 2013 Non-Final Office Action mailed Dec. 26, 2014, 45 pages.
U.S. Appl. No. 13/919,702, filed Jun. 17, 2013 Final Office Action mailed Nov. 18, 2014, 24 pages.
U.S. Appl. No. 13/886,873, filed May 3, 2013, Notice of Allowance mailed Oct. 24, 2014, 40 pages.

* cited by examiner

TELEVISION RECEIVER ENHANCEMENT FEATURES

BACKGROUND

The advent of the DVR (Digital Video Recorder) and the availability of high-capacity and affordable computer-readable storage devices have made available many possibilities to television programming service providers and viewers alike. In recent years, television viewers have come to expect the ability to customize, manage, and have seamless and robust access to various types of content via their television receivers.

SUMMARY

This summary does not in any way limit the scope of the claimed subject matter.

In an aspect, a television receiver the includes or comprises one or more processors and memory communicatively coupled with and readable by the one or more processors is disclosed. The one or more processors may have stored therein processor-readable instructions that, when executed by the one or more processors, cause the one or more processors to output for presentation by a display device at least one predefined clip of recorded media provided by a content provider when a prior playback of the recorded media has at least exceeded a non-zero time threshold. The one or more processors may have stored therein processor-readable instructions that, when executed by the one or more processors, cause the one or more processors to output for presentation by the display device particular content that is separate from but associated with and that describes particular media provided by the content provider, and that is provided by customers of the content provider in place of content that is separate from but associated with and that describes the particular media provided by an entity other than customers of the content provider.

In an aspect, a computer-implemented method is disclosed. The method may include or comprise receiving a request to access recorded media content. The method may include or comprise determining whether a prior playback of the recorded media content has exceeded a particular time threshold value. The method may include or comprise outputting for presentation at least one clip of the recorded media content based on information within a summary file when the prior playback of the recorded media content has at least exceeded the particular time threshold value, and the summary file of the recorded media content is available. The at least one clip may be contained within the recorded media content prior to a time associated with a ceasing of the prior playback of the recorded media content.

In an aspect, a computer-implemented method is disclosed. The method may include or comprise receiving a first indication, based on user input within an electronic programming guide, to access a first interface that presents content associated with particular broadcast content and that is originated by an entity other than customers of a content provider. The method may include or comprise receiving a second indication, based on user input within the electronic programming guide, to access a second interface that presents content associated with the particular broadcast content and that is originated by customers of the content provider. The method may include or comprise outputting for presentation by a display device particular customer-generated content associated with the particular broadcast content that has a ranking greater than other customer-generated content associated with the particular broadcast content.

DETAILED DESCRIPTION

The present disclosure is directed to or towards providing one or more features that together or separately enhance television receiver-related QoE or QoS (Quality of Experience or Quality of Service). Such features may, among other things, serve to entice new customers to subscribe to satellite television, audio programming, and/or interactive television services offered by a particular content provider, as well as provide an incentive for existing customers to maintain their loyalty and/or relationship with the particular content provider. Although not so limited, an appreciation of the various aspects of the present disclosure may be gained from the following discussion in connection with the drawings.

Figure 1:
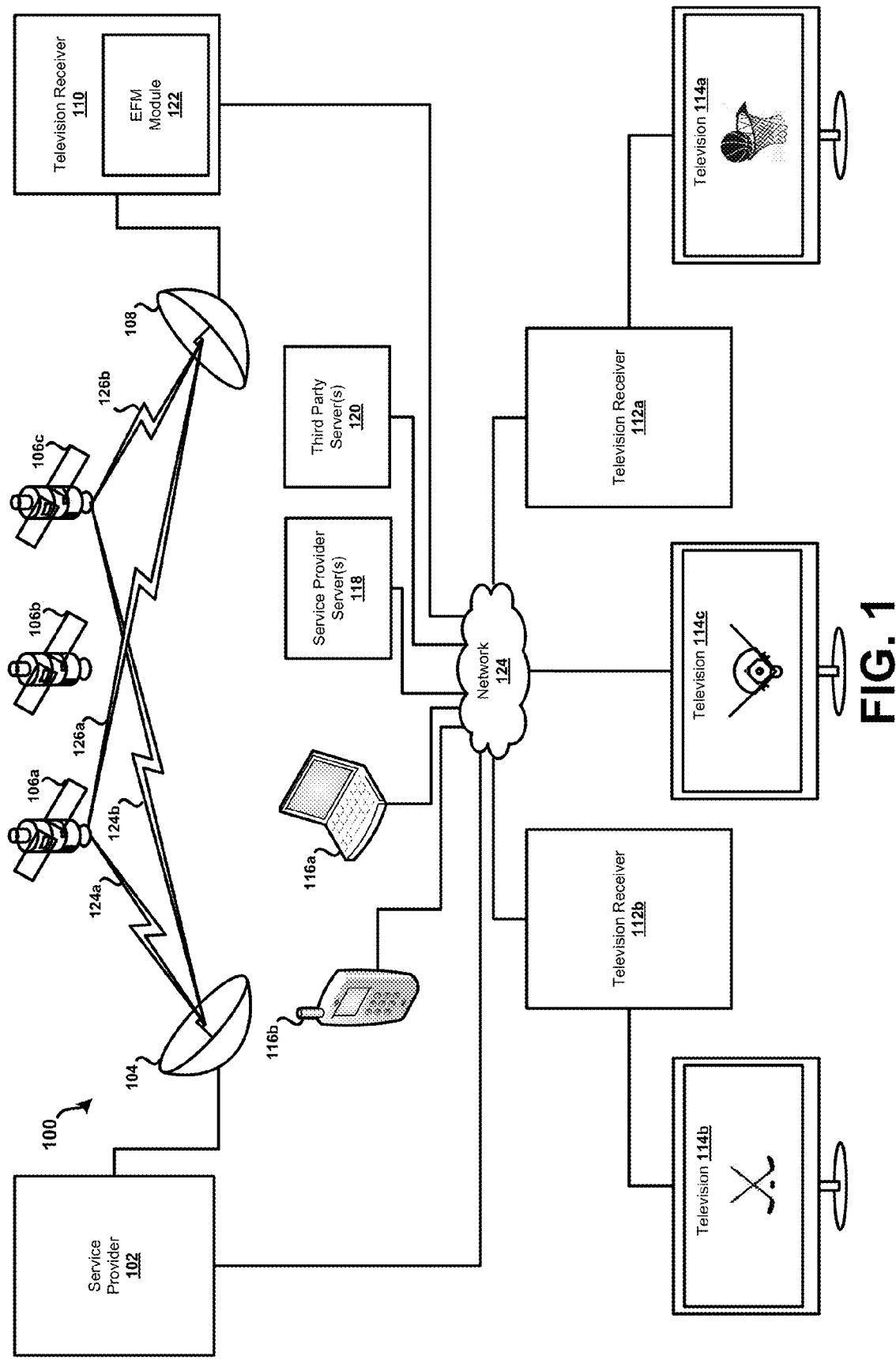
FIG. 1 shows an example system in accordance with the present disclosure.

For instance, referring now to FIG. 1, an example media content distribution system 100 is shown in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The example system 100 may include a service provider 102, a satellite uplink 104, a plurality of orbiting (e.g., geosynchronous) satellites 106a-c, a satellite dish 108, a PTR (Primary Television Receiver) 110, a plurality of STRs (Secondary Television Receivers) 112a-b, a plurality of televisions 114a-c, a plurality of computing devices 116a-b, at least one server 118 associated with the service provider 102, and at least one third party server 120 not associated with the service provider 102. In the present example, the PTR 110 may include an EFM (Enhancement Features Module) 122. In general, and as discussed throughout, the EFM module 122 may be configured to provide one or more features that together or separately enhance QoE or QoS as a particular user interacts with any one of the PTR 110 and STRs 112a-b.

The system 100 may also include at least one network 124 that establishes a bi-directional communication path for data transfer between and among each respective element or component of the example system 100. In some embodiments, the network 124 may further establish a bi-directional communication path for data transfer between the PTR 110 and the service provider 102. The network 124 is intended to represent any number of terrestrial and/or non-terrestrial network features or elements. For example, the network 124 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the example system 100.

The PTR 110, and the STRs 112*a-b*, as described throughout may generally be any type of television receiver, such as a STB (Set-Top-Box) for example. In another example, the PTR 110, and the STRs 112*a-b*, may exhibit functionality integrated as part of or into a television, a DVR, a computer such as a tablet computing device, or any other computing system or device, as well as variations thereof. Further, the PTR 110 and the network 124, together with the STRs 112*a-b* and televisions 114*a-c*, and possibly the computing devices 116*a-b* and one or more of the server(s) 118 and 120, may be incorporated within or form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 100 may be configured to communicate in accordance with the MoCA® (Multimedia over Coax Alliance) home entertainment networking standard. Still other embodiments are possible.

In practice, the satellites 106*a-c* may each be configured to receive uplink signals 124*a-b* from the satellite uplink 104. In this example, the uplink signals 124*a-b* may contain one or more transponder streams of particular data or content, such as particular television channel, that is supplied by the service provider 102. For example, each of the respective uplink signals 124*a-b* may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 106*a-c*. Further, different media content may be carried using different transponders of a particular satellite (e.g., satellite 106*a*); thus, such media content may be transmitted at different frequencies and/or different frequency ranges. For example, a first and second television channel may be carried on a first carrier frequency over a first transponder of satellite 106*a*, and a third, fourth, and fifth television channel may be carried on second carrier frequency over a first transponder of satellite 106*b*, or, the third, fourth, and fifth television channel may be carried on a second carrier frequency over a second transponder of satellite 106*a*, and etc.

The satellites 106*a-c* may further be configured to relay the uplink signals 124*a-b* to the satellite dish 108 as downlink signals 126*a-b*. Similar to the uplink signals 124*a-b*, each of the downlink signals 126*a-b* may contain one or more transponder streams of particular data or content, such as various encoded and/or at least partially electronically scrambled television channels, on-demand programming, etc., in accordance with an allotted carrier frequency and bandwidth. The downlink signals 126*a-b*, however, may not necessarily contain the same or similar content as a corresponding one of the uplink signals 124*a-b*. For example, the uplink signal 124*a* may include a first transponder stream containing at least a first group or grouping of television channels, and the downlink signal 126*a* may include a second transponder stream containing at least a second, different group or grouping of television channels. In other examples, the first and second group of television channels may have one or more television channels in common. In sum, there may be varying degrees of correlation between the uplink signals 124*a-b* and the downlink signals 126*a-b*, both in terms of content and underlying characteristics.

Continuing with the example implementation-specific scenario, the satellite dish 108 may be provided for use to receive television channels (e.g., on a subscription basis) provided by the service provider 102, satellite uplink 104, and/or satellites 106*a-c*. For example, the satellite dish 108 may be configured to receive particular transponder streams, or downlink signals 126*a-b*, from one or more of the satellites 106*a-c*. Based on the characteristics of the PTR 110 and/or satellite dish 108, however, it may only be possible to capture transponder streams from a limited number of transponders concurrently. For example, a tuner of the PTR 110 may be configured to tune to a single transponder stream from a transponder of a single satellite at a time.

Additionally, the PTR 110, which is communicatively coupled to the satellite dish 108, may subsequently select via tuner, decode, and relay particular transponder streams to the television 114*c* for display thereon. For example, the satellite dish 108 and the PTR 110 may, respectively, be configured to receive, decode, and relay at least one premium HD-formatted television channel to the television 114*c*. Programming or content associated with the HD channel may generally be presented live, or from a recording as previously stored on, by, or at the PTR 110. In this example, the HD channel may be output to the television 114*c* in accordance with the HDMI/HDCP content protection technologies. Other embodiments are possible.

Further, the PTR 110 may select via tuner, decode, and relay particular transponder streams to one or both of the STRs 112*a-b*, which may in turn relay particular transponder streams to a corresponding one of the television 114*a* and the television 114*a* for display thereon. For example, the satellite dish 108 and the PTR 110 may, respectively, be configured to receive, decode, and relay at least one television channel to the television 114*a* by way of the STR 112*a*. Similar to the above-example, the television channel may generally be presented live, or from a recording as previously stored on the PTR 110, and may be output to the television 114*a* by way of STR 112*a* in accordance with a particular content protection technology and/or networking standard. Still further, the satellite dish 108 and the PTR 110 may, respectively, be configured to receive, decode, and relay at least one premium television channel to one or both of the computing devices 116*a-b*. Similar to the above-examples, the television channel may generally be presented live, or from a recording as previously stored on the PTR 110, and may be output to one or both of the computing devices 116*a-b* in accordance with a particular content protection technology and/or networking standard.

Figure 2:
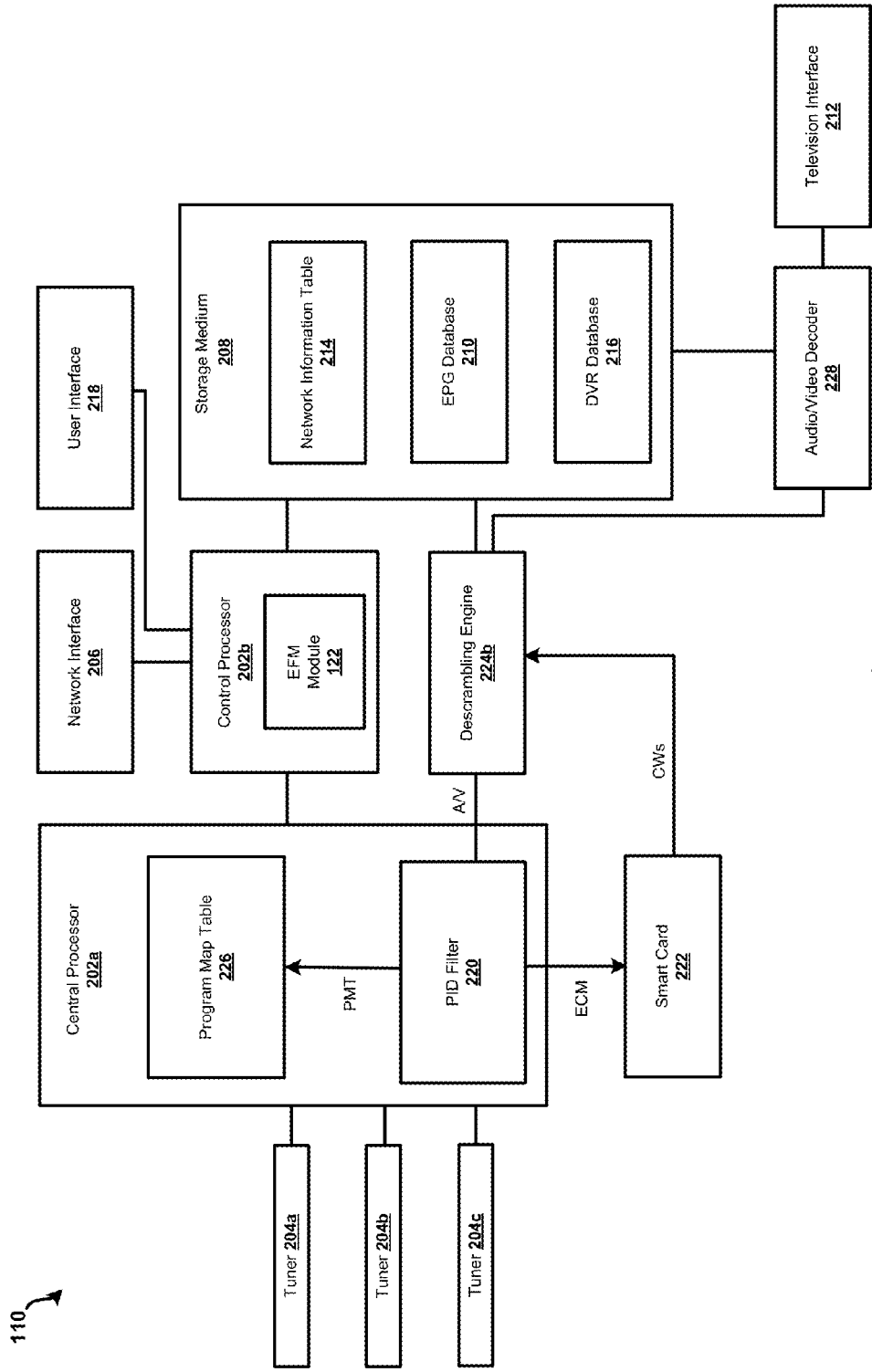
FIG. 2 shows a block diagram of a television receiver of FIG. 1.

Referring now to FIG. 2, an example block diagram of the PTR 110 of FIG. 1 is shown in accordance with the present disclosure. In some embodiments, at least one of the STRs 112*a-b* may be configured in a manner similar to that of the PTR 110. In other embodiments, at least one of the STRs 112a-b may be configured to exhibit a reduced functionality as compared to the PTR 110, and may depend at least to a certain degree on the PTR 110 to implement certain features or functionality. In this example, the STRs 112a-b may be referred to as a "thin client."

For brevity, the PTR 110 is depicted in a simplified and conceptual form, and may generally include more or fewer elements or components as desired in accordance with the present disclosure. For example, the PTR 110 is shown in FIG. 2 to include the EFM module 122 as mentioned above in connection with FIG. 1. Additionally, although not explicitly shown in FIG. 2, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Additionally, the PTR 110 may be configured to include any number of other various components or logical modules that are implemented in hardware, software, firmware, or any combination thereof, and such components or logical modules may or may not be implementation-specific.

In some embodiments, the PTR 110 and/or the STRs 112a-b comprises of a STB. In addition to being in the form of an STB, at least the PTR 110 may be incorporated into another device, such as the television 114c as shown in FIG. 1. For example, the television 114c may have an integrated television receiver that does not involve an external STB being coupled with the television 114c. A STB may contain some or all of the components of the PTR 110 and/or may be able to perform some or all of the functions of the PTR 110. Accordingly, instances in this document referring to a STB, and steps being performed by a STB, may also be performed, more generally, by the PTR 110 and/or STRs 112a-b.

Referring still to FIG. 2, the PTR 110 may include at least one processor 202, including a central processor 202a and a control processor 202b, a plurality of tuners 204a-c, at least one network interface 206, at least one non-transitory computer-readable storage medium 208, at least one EPG database 210, at least one television interface 212, at least one NIT (Networking Information Table) 214, at least one DVR database 216, at least one user interface 218, at least one PID filter 220, at least one smart card 222, at least one descrambling engine 224, at least one PMT (Program Map Table) 226, and at least one decoder 228. In other embodiments of the PTR 110, fewer or greater numbers of components may be present. Further, functionality of one or more components may be combined; for example, functions of the descrambling engine 224 may be performed by the central processor 202a. Still further, functionality of components may be spread among additional components. For example, the PID filter 220 may be handled by hardware and/or software separate from the PMT 226.

The processor 202 may include one or more specialized and/or general-purpose processors configured to perform processes such as tuning to a particular channel, accessing and displaying EPG information from the EPG database 210, and/or receiving and processing input from a user. For example, processor 202 may include one or more processors dedicated to decoding video signals from a particular format, such as MPEG, for output and display on a television and for performing or at least facilitating decryption or descrambling.

The control processor 202b may communicate with the central processor 202a. The control processor 202b may control the recording of television channels based on timers stored in the DVR database 216. The control processor 202b may initiate recording of a television channel by sending a record command along with an indication of the television channel to be recorded to the central processor 202a. The control processor 202b may not send a second record command, when additional recording is to begin at the same time, until an acknowledgement that recording of the first television channel has successfully been received and initiated by the central processor 202a. The control processor 202b may also provide commands to the central processor 202a when recording of a television channel is to cease. In addition to providing commands relating to the recording of television channels, the control processor 202b may provide commands to the central processor 202a that indicate television channels to be output to the decoder 228 for output to a presentation device, such as the television 114c for example.

The control processor 202b may also communicate with the network interface 206 and the user interface 218. The control processor 202b may handle incoming data from the network interface 206 and the user interface 218. Additionally, the control processor 202b may be configured to output data via the network interface 206. Additionally, the control processor 202b may be configured to provide one or more features that together or separately enhance QoE or QoS as a particular user interacts with the PTR 110. Other embodiments are possible. For example, such functionality may be wholly or at least partially implemented by the central processor 202a. Still other embodiments are possible.

The tuners 204a-c may be used to tune to television channels, such as television channels transmitted via satellite or cable, such as satellites 106a-c. Each respective one of the tuner 204a-c may be capable of receiving and processing a single stream of data from a satellite transponder, or a cable channel, at a given time. As such, a single tuner may tune to a single transponder or, for a cable network, a single cable channel. Additionally, one tuner (e.g., tuner 204a) may be used to tune to a television channel on a first transponder stream for display using a television, while another tuner (e.g., tuner 204b) may be used to tune to a television channel on a second transponder for recording and viewing at some other time. Still another tuner (e.g., tuner 204c) may be used to check various television channels to determine if they are available or not. If multiple television channels transmitted on the same transponder stream are desired, a particular tuner (e.g., tuner 204a) may be used to receive the signal containing the multiple television channels for presentation and/or recording. The tuners 204a-c may receive commands from the central processor 202a and/or control processor 202b. Such commands may instruct the tuners 204a-c which frequencies are to be used for tuning.

The network interface 206 may be used to communicate via an alternate communication channel with a television service provider. For example, the primary communication channel between the television service provider and the PTR 110 may be via satellite, which may be unidirectional to the STB, and an another communication channel between the television service provider and the PTR 110, which may be bidirectional, may be via a network, such as the Internet. The PTR 110 may be able to communicate with the service provider 102 of FIG. 1 via a network, such as the Internet (e.g., network 124). This communication may be bi-directional. For example, data may be transmitted from the PTR 110 to the service provider 102, and from the service provider 102 to the PTR 110. The network interface 206 may be configured to communicate via one or more networks, such as the Internet, to communicate with the service provider 102. Information may be transmitted and/or received via the network interface 206.

The storage medium 208 may represent a non-transitory computer-readable storage medium. The storage medium 208 may include memory and/or a hard drive. The storage medium 208 may be used to store information received from one or more satellites and/or information received via the network interface 206. The storage medium 208 may store information related to the EPG database 210, the NIT 214, and/or the DVR database 216, among other elements or features. Recorded television programs may be stored using the storage medium 208. The storage medium 208 may be partitioned or otherwise divided such that predefined amounts of the storage medium 208 are devoted to storage of omnibus channel files and user-selected television programs.

The EPG database 210 may store information related to television channels and the timing of programs appearing on such television channels. The EPG database 210 may be stored using the storage medium 208, which may be a hard drive. Information from the EPG database 210 may be used to inform users of what television channels or programs are popular and/or provide recommendations to the user. Information from the EPG database 210 may provide the user with a visual interface displayed by a television that allows a user to browse and select television channels and/or television programs for viewing and/or recording. Information used to populate the EPG database 210 may be received via the network interface 206 and/or via satellites, such as satellites 106a-c of FIG. 1 via the tuners 204a-c. For instance, updates to the EPG database 210 may be received periodically via satellite. The EPG database 210 may serve as an interface for a user to control DVR functions of the PTR 110, and/or to enable viewing and/or recording of multiple television channels simultaneously.

In addition to being used to provide users with information about scheduled programming, information from the EPG database 210 may be used to determine when television programs begin and end for the purposes of recording. For instance, when a channel-specific file is recorded that contains multiple television channels, the start and end of time of specific television programs within the channel-specific file may be based on the start and end times indicated in the EPG database 210. Other data may be stored within the EPG database 210 that may be useful in managing channel-specific files, such as series identifiers and episode identifiers, which may be used by a television service provider to identify particular television programs.

The decoder 228 may serve to convert encoded video and audio into a format suitable for output to a display device. For instance, the decoder 228 may receive MPEG video and audio from the storage medium 208, or the descrambling engine 224, to be output to a television. MPEG video and audio from the storage medium 208 may have been recorded to the DVR database 216 as part of a previously-recorded television program. The decoder 228 may convert the MPEG video and audio into a format appropriate to be displayed by a television or other form of display device and audio into a format appropriate to be output from speakers, respectively.

The television interface 212 may serve to output a signal to a television, or another form of display device, in a proper format for display of video and playback of audio. As such, the television interface 212 may output one or more television channels, stored television programming from the storage medium 208, such as television programs from the DVR database 216 and/or information from the EPG database 210 for example, to a television for presentation.

The NIT 214 may store information used by the PTR 110 to access various television channels. The NIT 214 may be stored using the storage medium 208. Information used to populate the NIT 214 may be received via satellite, or cable, via the tuners 204a-c and/or may be received via the network interface 206 from a service provider. As such, information present in the NIT 214 may be periodically updated. The NIT 214 may be locally-stored by the PTR 110 using the storage medium 208. Information that may be present in the NIT 214 may include, for example: television channel numbers, a satellite identifier, a frequency identifier, a transponder identifier, an ECM (Entitlement Control Message), a PID (Packet Identifier), one or more audio PIDs, and a video PID. A second audio PID of a channel may correspond to a SAP (Second Audio Program) program, such as in another language. In some embodiments, the NIT 214 may be divided into additional tables. For example, rather than the specific audio PIDs and video PIDs being present in the NIT 214, a channel identifier may be present within NIT 214 which may be used to look up the audio PIDs and video PIDs in another table, such as the PMT 226. For example, the PMT 226 may store information on audio PIDs and video PIDs for television channels that are transmitted on a transponder frequency.

Table 1 below provides a simplified example of the NIT 214 for several television channels. It should be understood that in other embodiments, many more television channels may be represented in the NIT 214. The NIT 214 may be at least periodically updated by a television service provider. As such, television channels may be reassigned to different satellites and/or transponders, and the PTR 110 may be able to handle this reassignment as long as the NIT 214 is updated.

TABLE 1

| Channel | Satellite | Transponder | ECM PID | PMT PID |
|---------|-----------|-------------|---------|---------|
| 4 | 1 | 2 | 27 | 1001 |
| 5 | 2 | 11 | 29 | 702 |
| 7 | 2 | 3 | 31 | 1001 |
| 13 | 2 | 4 | 33 | 704 |

Based on information in the NIT 214, it may be possible to determine the proper satellite and transponder to which to tune for a particular television channel. In some embodiments, the NIT 214 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

The values provided in Table 1 are for example purposes only. Actual values, including how satellites and transponders are identified, may vary. Additional information may also be stored in NIT 214. The same PID may be reused on different transponders.

A DVR may permit a television channel to be recorded for a period of time. DVR functionality of the PTR 110 may be managed by the control processor 202b. The control processor 202b may coordinate the television channel, start time, and stop time of when recording of a television channel is to occur. The DVR database 216 may store information related to the recording of television stations. The DVR database 216 may store timers that are used by the control processor 202b to determine when a television channel should be tuned to and its programs recorded to the DVR database 216. However, other embodiments are possible. For example, in some embodiments, the storage medium 208 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 208 may be devoted to the DVR database 216. Timers may be set by a service provider and/or one or more users of the PTR 110.

DVR functionality of the control processor 202b may have multiple modes. For example, DVR functionality of the control processor 202b may be configured to record individual television programs selected by a user to the DVR database 216. Using the EPG database 210, a user may select a particular television program. Based on the date, time period, and television channel indicated by the EPG database 210, the control processor 202b may record the associated television program to the DVR database 216. In another example, the DVR database 216 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by a television service provider (e.g., service provider 102).

The user interface 218 may include a remote control, physically separate from PTR 110, and/or one or more buttons on the PTR 110 that allows a user to interact with the PTR 110. The user interface 218 may be used to select a television channel for viewing, view information from the EPG database 210, and/or program a timer stored to the DVR database 216 wherein the timer may be used to control the DVR functionality of the control processor 202b.

Referring back to tuners 204a-c, television channels received via satellite, or cable, may contain at least some scrambled data. Packets of audio and video may be scrambled to prevent unauthorized users, such as nonsubscribers, from receiving television programming without paying the television service provider. When one of the tuners 204a-c is receiving data from a particular transponder of a satellite, the transponder stream may be a series of data packets corresponding to multiple television channels. Each data packet may contain a PID, which, in combination with the NIT 214 and/or the PMT 226, can be determined to be associated with particular television channel. Particular data packets, referred to as ECMs may be periodically transmitted. ECMs may be associated with another PID and may be encrypted; the PTR 110 may use the smart card 222 to decrypt ECMs. Decryption of an ECM may only be possible when the user (e.g., PTR 110) has authorization to access the particular television channel associated with the ECM. When an ECM is determined to correspond to a television channel being stored and/or displayed, the ECM may be provided to the smart card 222 for decryption.

When the smart card 222 receives an encrypted ECM, the smart card 222 may decrypt the ECM to obtain some number of control words. In some embodiments, from each ECM received by the smart card 222, two control words are obtained. In some embodiments, when the smart card 222 receives an ECM, it compares the ECM to the previously received ECM. When the two ECMs match, the second ECM is not decrypted because the same control words would be obtained. In other embodiments, each ECM received by the smart card 222 is decrypted; however, when a second ECM matches a first ECM, the outputted control words will match; thus, effectively, the second ECM does not affect the control words output by the smart card 222. The smart card 222 may be permanently part of the PTR 110 or may be configured to be inserted and removed from PTR 110.

The central processor 202a may be in communication with the tuners 204a-c and the control processor 202b. The central processor 202a may be configured to receive commands from the control processor 202b. Such commands may indicate when to start/stop recording a television channel and/or when to start/stop causing a television channel to be output to a television. The central processor 202a may control the tuners 204a-c. The central processor 202a may provide commands to the tuners 204a-c that instruct the tuners which satellite, transponder, and/or frequency to tune to. From the tuners 204a-c, the central processor 202a may receive transponder streams of packetized data. As previously detailed, some or all of these packets may include a PID that identifies the content of the packet.

The central processor 202a may be configured to create at least one PID filter 220 that sorts packets received from the tuners 204a-c based on the PIDs. When a tuner is initially tuned to a particular frequency, such as a particular transponder of a satellite, a PID filter may be created based on a PID of PMT data. The PID of PMT data packets may be known because it is stored as part of the NIT 214. From the PMT data packets, the PMT 226 may be constructed by central processor 202a.

Table 2 below provides an example extract of a PMT. The PMT 226 may be specific to a particular transponder. As such, when tuning to a different transponder occurs, a new PMT may be created for the different transponder. Accordingly, based on the information present in the PMT 226, the audio and video PIDs for specific television channels may be identified. A television channel may have multiple audio PIDs due to a second audio program, which may be in a different language.

TABLE 2

| Channel | Video PID | $1^{st}$ Audio PID | $2^{nd}$ Audio PID |
| --- | --- | --- | --- |
| 4 | 1003 | 2383 | 2119 |
| 5 | 2993 | 2727 | 2728 |
| 7 | 9238 | 1233 | 0129 |
| 13 | 0012 | 9348 | — |

The values provided in Table 2 are for example purposes only. Actual values may vary. Additional information or less information may also be stored in the PMT 226.

The PID filter 220 may be configured to filter data packets based on PIDs. In some embodiments, the PID filter 220 is created and executed by central processor 202a. In other embodiments, separate hardware may be used to create and execute multiple PID filters. Depending on a television channel selected for recording/viewing, a PID filter may be created to filter the video and audio packets associated with the television channel, based on the PID assignments present in the PMT 226. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 224 or the smart card 222; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 214, may be appropriately routed by the PID filter 220. At a given time, one or multiple PID filters may be executed by the central processor 202*a*.

The descrambling engine 224 may use the control words output by the smart card 222 in order to descramble video and/or audio corresponding to television channels for storage and/or presentation. Video and/or audio data contained in the transponder data stream received by the tuners 204*a-c* may be scrambled. Video and/or audio data may be descrambled by descrambling engine 224 using a particular control word. Which control word output by the smart card 222 to be used for successful descrambling may be indicated by a scramble control identifier present within the data packet containing the scrambled video or audio. Descrambled video and/or audio may be output by the descrambling engine 224 to the storage medium 208 for storage in the DVR database 216 and/or to the decoder 228 for output to a television or other presentation equipment via the television interface 212.

For simplicity, the PTR 110 of FIG. 2 has been reduced to a block diagram; commonly known parts, such as a power supply, have been omitted. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules. Further, the components of the PTR 110 may be part of another device, such as built into a television. Also, while the PTR 110 may be used to receive, store, and present television channels received via a satellite, it should be understood that similar components may be used to receive, store, and present television channels via a cable network.

Figure 3:
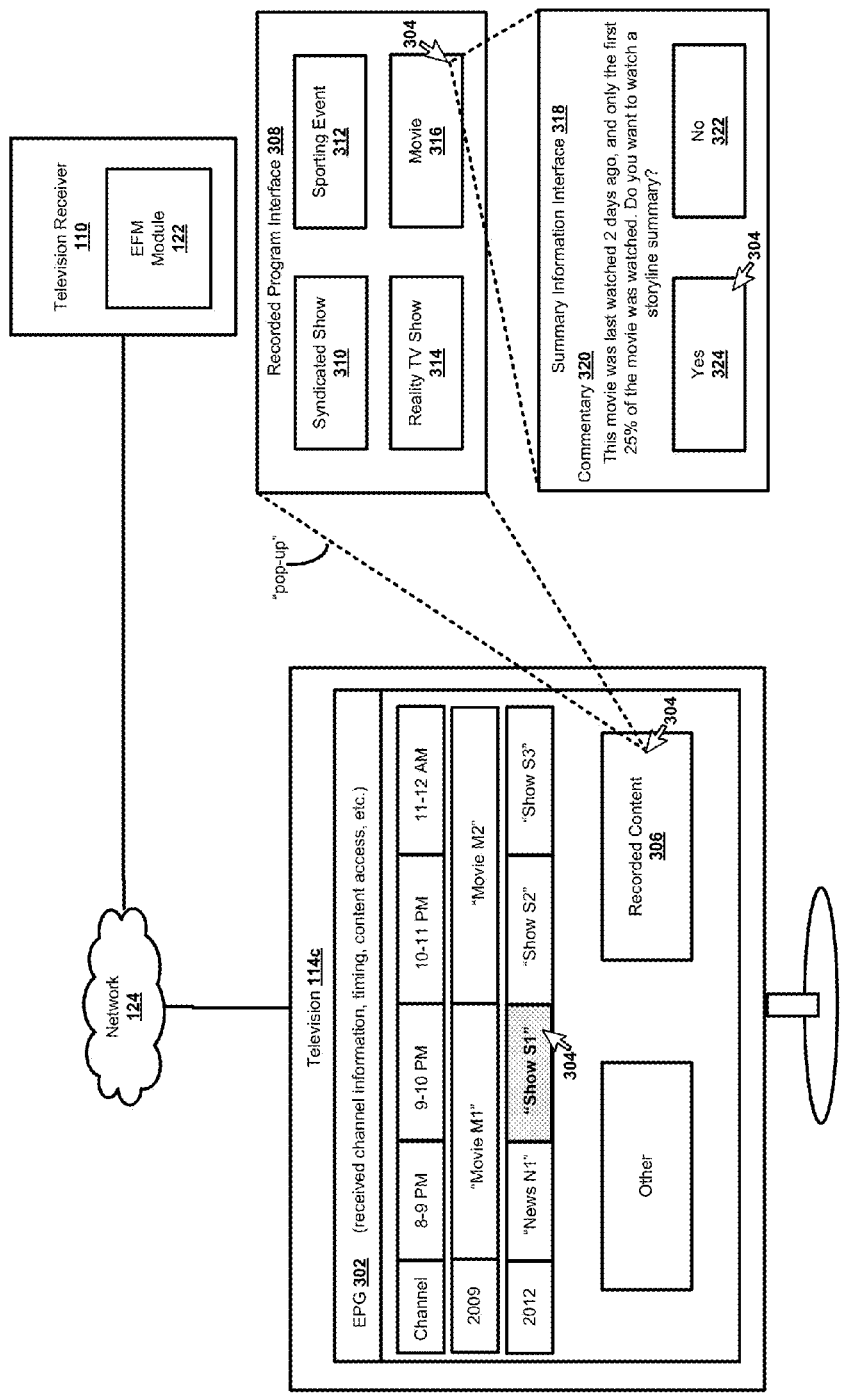
FIG. 3 shows first aspects of the system of FIG. 1 in detail.

Referring now to FIG. 3, first aspects of the example system 100 of FIG. 1 are shown in detail. In particular, the PTR 110 may be configured to output an EPG (Electronic Programming Guide) 302 to and for presentation by at least the television 114*c*. The EPG 302 may at least present various information related to television channels and the timing of programs or programming appearing on such television channels, such as television channels as received from one or more of the satellites 106*a-c*. For example, the EPG 302 may display channel information associated with a channel 2012, where a Show S1 is listed as scheduled to appear on the channel 2012 during a particular time period 9-10 PM of a particular day, etc. In this example, and assuming that a current time is sometime during the time period 9-10 PM of a particular day, a user may manipulate a cursor 304 using a pointing device (not shown) to select the Show S1, indicated by light stipple shading in FIG. 3, for immediate viewing on the television 114*c*. Other embodiments are possible. For example, it is contemplated that any means consistent with menu-driven navigation may be used to interact with the EPG 302, and respective elements of the EPG 302.

The EPG 302 may further display or otherwise present a first selection 306 that may be selected by a user to access recorded media content. In this example, the PTR 110 may exhibit DVR functionality to record programs or programming appearing on various channels as received from satellites 106*a-c*. In response to selection of the first selection 306, a first interface 308 may be displayed within at least a portion of the EPG 302 on the television 114*c*, or possibly replace the EPG 302 entirely for display on or by the television 114*c*, that may include a listing or inventory of all recorded programming currently accessible for immediate viewing. In the example shown, a user may manipulate the cursor 304 to select at a particular time one of a second selection 310 to access a particular Syndicated Show, such as "The Daily Show" for example, for immediate viewing on the television 114*c*, a third selection 312 to access a particular Sporting Event, such as "The Super Bowl" for example, for immediate viewing on the television 114*c*, a fourth selection 314 to access a particular Reality TV Show, such as "American Idol" for example, for immediate viewing on the television 114*c*, and a fifth selection 316 to access a particular Movie (herein "Movie"), such as "Titanic" for example, for immediate viewing on the television 114*c*. Other embodiments are possible.

In many instances, people are busy and it may be difficult to sit down for an extended period of time to watch recorded content. For example, it is often difficult for a parent of young child to devote two or more hours at a time to watch a movie, and it sometimes may take a number of viewing sessions spread out over several days to watch a movie to completion. It may thus be difficult to remember plot points because the movie is watched over the course of a relatively extended period of time. Aspects of the present disclosure may address these and other issues that may be experienced when any particular recorded content is watched over a relatively extended period.

For example, referring still to FIG. 3, a user may manipulate the cursor 304 to select the fifth selection 316 to access the Movie for immediate viewing on the television 114*c*. In response to selection of the fifth selection 316, a second interface 318 may be displayed within for example at least a portion the EPG 302 on the television 114*c*. In general, the second interface 318 may provide commentary 320 regarding the status of playback of the Movie such as, for example, "This movie was last watched 2 days ago, and only the first 25% of the movie was watched. Do you want to watch a storyline summary?" Here, it is contemplated that a user may optionally manipulate the cursor 304 to select a sixth selection 322 to resume viewing of the Movie on the television 114*c* starting at a point in the Movie associated with where the previous session left off, referred to as a "resume point," or optionally manipulate the cursor 304 to select a seventh selection 324 to access a storyline summary of the particular Movie for immediate viewing on the television 114*c*. An example of such an implementation is discussed in further detail below connection with FIG. 4 and FIG. 5. However, it will be appreciated that the foregoing and following discussion may also apply to at least any of the Syndicated Show, the Sporting Event, and the Reality TV Show as shown in FIG. 3. Further, it will be appreciated that aspects of the present disclosure may be applicable to any type of form of recorded audio and/or video media content.

Figure 4:
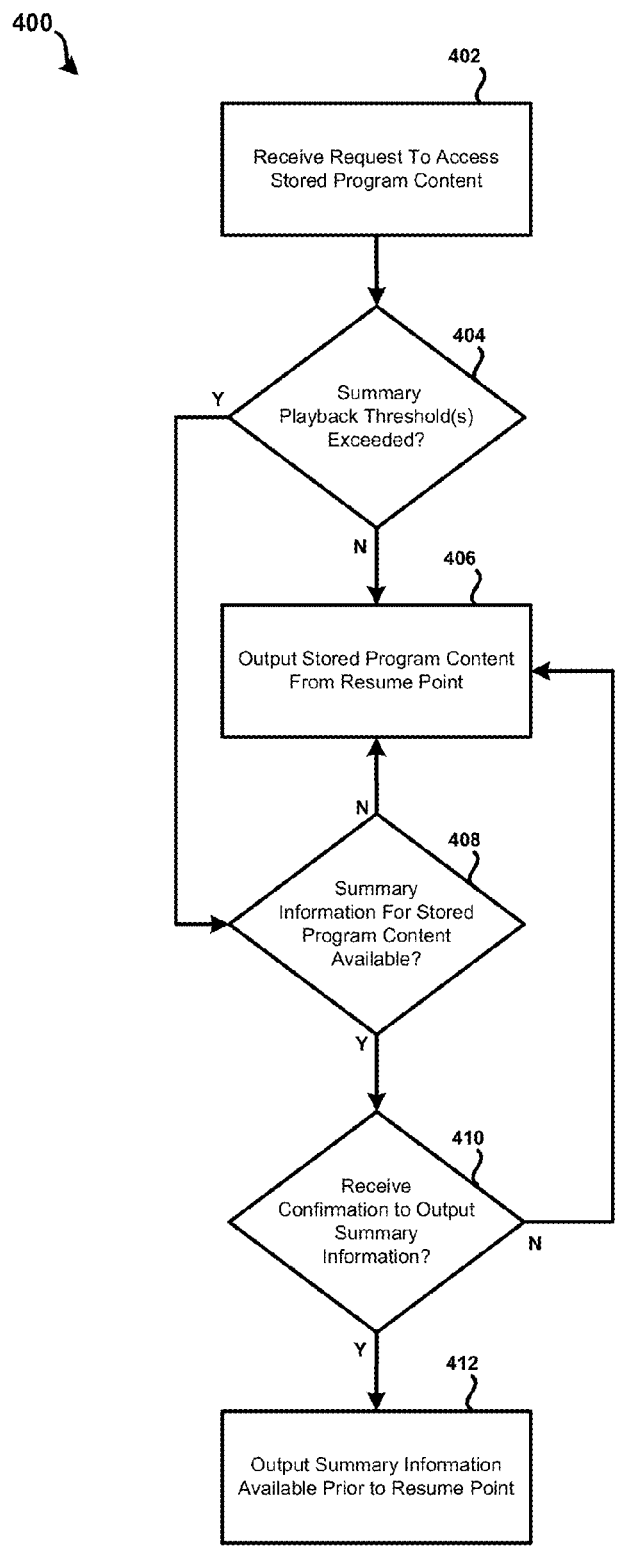
FIG. 4 shows an example method in accordance with the present disclosure.

Referring now to FIG. 4, an example method 400 is shown in accordance with the present disclosure. In general, steps or modules of the method 400 as described may ultimately be implemented by at least one of the EFM module 122 of the PTR 110, and/or PTR 110 itself, of FIG. 1. Other embodiments are however possible. For example, one or more steps or modules of the method 400 may be implemented wholly or at least partially by or on one or more of the other respective devices or components within the system 100 as described above in connection with FIG. 1.

At step 402, the EFM module 122 may receive a request to access particular recorded media or content. For example, the EFM module 122 may detect selection of the fifth selection 316 associated with the Movie as shown in FIG. 3. As discussed above, a user may manipulate the cursor 304 to access the Movie for immediate viewing as desired. Other embodiments are possible.

At step 404, the EFM module 122 may evaluate whether at least one predefined and configurable threshold has been exceeded, for the purpose of determining whether or not to provide an option to a user to access a storyline summary of the Movie for immediate viewing on the television 114c. For example, the EFM module 122 may access a particular table or file stored by the PTR 110 and that is associated with the Movie, and determine how long it has been since the Movie was last watched. For example, the EFM module 122 may determine that the Movie was last watched 48 hours ago from a present time. In this example, the EFM module 122 may compare the time value of 48 hours to an example first non-zero time threshold value of 24 hours and, since the time value of 48 hours is greater than or equal to the threshold value of 24 hours, the EFM module 122 may determine that it is appropriate to provide an option to a user to access a storyline summary of the Movie for immediate viewing on the television 114c. In contrast, and assuming that the time value is not 48 hours and is instead 20 hours, the EFM module 122 may determine that it is not appropriate to provide an option to a user to access a storyline summary of the Movie for immediate viewing on the television 114c because the time value of 20 hours is less than the threshold value of 24 hours.

In another example, the EFM module 122 may additionally or alternatively access the particular table or file associated with the Movie and determine how much of the same was watched at a prior viewing session. For example, the EFM module 122 may determine that the Movie was watched to a point associated with 25% completion as measured from the start or beginning of the Movie. In this example, the EFM module 122 may compare a time value of 30 minutes, which corresponds to 25% completion assuming the Movie is 120 minutes in length or duration, to an example second non-zero time threshold value of 24 minutes, which corresponds to 20% completion in the example scenario and, since the time value of 30 minutes is greater than or equal to the threshold value of 24 minutes, the EFM module 122 may determine that it is appropriate to provide an option to a user to access a storyline summary of the Movie for immediate viewing on the television 114c. In contrast, and assuming that the time value is not 30 minutes and is instead 20 minutes, the EFM module 122 may determine that it is not appropriate to provide an option to a user to access a storyline summary of the Movie for immediate viewing on the television 114c because the time value of 20 minutes is less than the threshold value of 24 minutes.

Upon the EFM module 122 determining at step 404 that at least one predefined and configurable threshold has not been exceeded, process flow within the example method 400 may branch to step 406. At step 406, the PTR 110 may output the Movie for display by the television 114c starting at a point in the movie associated with where a previous viewing session left off. For example, the PTR 110 may output the Movie for display by the television 114c starting at a time of 30 minutes or slightly less into the Movie. Upon the EFM module 122 determining at step 404 however that at least one predefined and configurable threshold has been exceeded, process flow within the example method 400 may branch to step 408.

At step 408, the EFM module 122 may determine whether or not a storyline summary of the Movie is available for immediate viewing. For example, the EFM module 122 may query the server 118 as shown in FIG. 1 and request access to a storyline summary of the Movie. In another example, the PTR 110 and/or the EFM module 122 may query the storage medium 208 as shown in FIG. 2 and request access to a storyline summary of the particular Movie. Such an implementation may or may not be based upon a predefined priority scheme. For example, the EFM module 122 may initially query the server 118 and request access to a storyline summary of the Movie so as to obtain a most up-to-date version of the storyline summary, assuming that it exists. If the server 118 is not accessible due to network problems, for example, the EFM module 122 may then query the storage medium 208 and request access to a storyline summary of the Movie. Still many other embodiments are possible. For example, the PTR 110 and/or the EFM module 122 may periodically, or at least intermittently, such as on a nightly basis, identify each and every instance of all programming that is currently stored or recorded to at least the PTR 110, and may then query one or both of the server 118 and the storage medium 208 and request access to a storyline summary of the Movie, or other type of summary when dealing with another type of recorded media, so that if available a particular summary may be ready for immediate access when needed. Still other embodiments are possible.

Continuing with the example scenario, upon the EFM module 122 determining at step 408 that a storyline summary of the Movie is not available, process flow within the example method 400 may branch to step 406. At step 406, the PTR 110 may output the Movie for display by the television 114c starting at a point in the Movie associated with where a previous session left off, in a manner such as described above. Upon the EFM module 122 determining at step 408 however that a storyline summary of the Movie is available, process flow within the example method 400 may branch to step 410.

At step 410, the EFM module 122 may generate the second interface 318, as discussed above in connection with FIG. 3, so that the PTR 110 may output for display by the television 114c the second interface 318. In this example, a user may optionally manipulate the cursor 304 to select the sixth selection 322 to resume viewing of the Movie on the television 114c starting at the resume point, or optionally manipulate the cursor 304 to select the seventh selection 324 to access a storyline summary of the particular Movie for immediate viewing on the television 114c. For example, upon the EFM module 122 determining at step 410 that the sixth selection 322 within the second interface 318 has been selected, process flow within the example method 400 may branch to step 406. At step 406, the PTR 110 may output the Movie for display by the television 114c starting at a point in the Movie associated with where a previous session left off, in a manner such as described above.

Upon the EFM module 122 determining at step 410 that the seventh selection 324 within the second interface 318 has been selected, process flow within the example method 400 may branch to step 412. At step 410, the EFM module 122 may access the storyline summary of the Movie so that the PTR 110 may output for display by the television 114c at least one clip of the Movie based on the storyline summary. As described in further detail below in connection with FIG. 5, the storyline summary may generally be of the form of a table that includes at least a timestamp that indicates a start time to playback the at least one clip, and a time duration that indicates a total time to playback the at least one clip. In practice, the EFM module 122 may read a particular timestamp and time duration, and then access the recording of the particular Movie at a time associated with the timestamp so that the PTR 110 may playback the particular Movie for the time duration. In this manner, the PTR 110 may output for display by the television 114c at least one clip of the Movie based on the storyline summary.

For example, the EFM module 122 may read a particular timestamp of t=5 minutes, and time duration of t=1 minute that is associated with the particular timestamp, so that the PTR 110 may then playback a clip of the Movie starting at a time 5 minutes into the Movie for a duration 1 minute. In other words, the PTR 110 may playback a 1 minute clip of the particular Movie starting from 5 minutes into the Movie as measured from the beginning of the Movie until 6 minutes into the Movie as measured from the beginning of the Movie. It will be appreciated that this is just an example and that many other embodiments are possible as well. For example, a particular timestamp and associated time duration may be defined as desired. Further, resolution of the particular timestamp and associated time duration may be limited only by the underlying technology. For example, a particular timestamp and associated time duration may be defined in terms of minutes, seconds, milliseconds, and etc.

In general, the storyline summary may include any number of entries so that any number of clips of the Movie may be played back in a particular manner as desired. For example, based on the storyline summary, the PTR 110 may playback a 1 minute clip of the Movie starting from 5 minutes into the Movie as measured from the beginning of the Movie until 6 minutes into the Movie as measured from the beginning of the Movie, and then immediately playback a 1.5 minute clip of the Movie starting from 10.5 minutes into the Movie as measured from the beginning of the Movie until 12 minutes into the Movie as measured from the beginning of the Movie, and etc. In accordance with the present disclosure, this may be performed until each and every clip as defined within the storyline summary that is located or positioned before or prior a particular resume point, and then the Movie may be played back to completion when desired starting at or from the resume point. Such a feature is discussed in further detail below in connection with FIG. 5.

Figure 5:
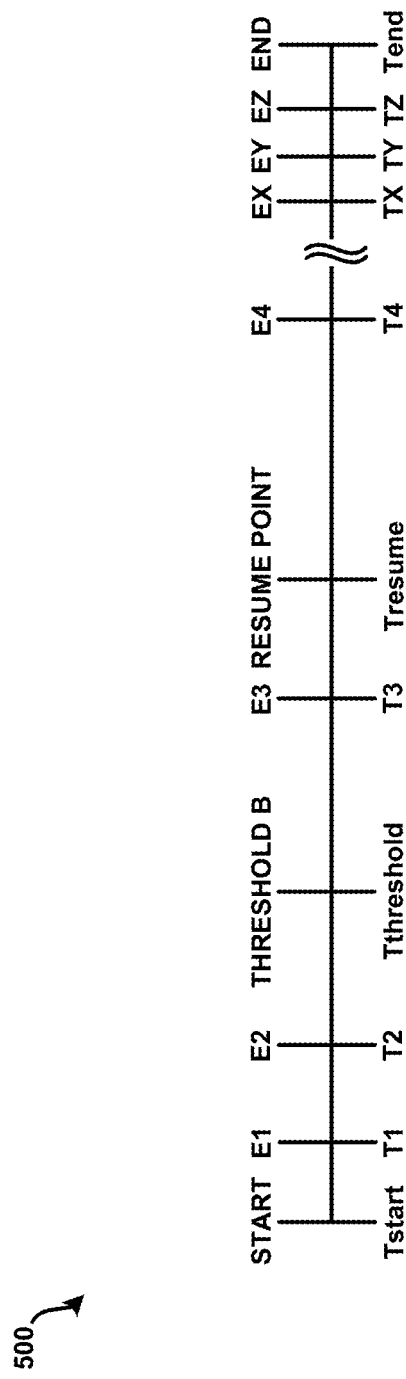
FIG. 5 shows an example timeline in accordance with the present disclosure.

Referring now to FIG. 5, an example timeline 500 is shown in accordance with the principles of the present disclosure. In particular, the timeline 500 shows a plurality of example plot points, referred to as Events $E_1$-$E_Z$, identified or positioned between a starting point, $T_{START}$, and an ending point, $T_{END}$, of the Movie of the prior discussion, along with a number of other parameters marked off between $T_{START}$ and $T_{END}$. Table 3 below consolidates or itemizes features of the timeline 500, and other features that may be associated with the timeline 500 in general.

TABLE 3

| Threshold A | Threshold B | Resume Point | Event:TimeStamp:Duration |
|---|---|---|---|
| 24 hours | 24 minutes | 70 minutes | E1:T1 = 5 min:D1 = 60 sec |
| — | — | — | E2:T2 = 10.5 min:D2 = 90 sec |
| — | — | — | E3:T3:D3 |
| — | — | — | E4:T4:D4 |
| — | — | — | etc. |
| — | — | — | EX:TX:DX |
| — | — | — | EY:TY:DY |
| — | — | — | EZ:TZ:DZ |

For example, and with reference to FIG. 5, column 1 of Table 3 includes a Threshold A of 24 hours. In general, Threshold A may correspond to the example first non-zero time threshold value of 24 hours as discussed above in connection with at least FIG. 4. Threshold A may be a configurable value that may be defined based on, for example, type of recorded content or media. For example, a time threshold value of 24 hours may be used when an associated type of recorded content or media is a movie. In another example, a time threshold value of 48 hours may be used when an associated type of recorded content or media is a Reality TV Show or Sporting Event. The Threshold A may be defined to be a greater value in these instances in comparison to a movie since a Reality TV Show or a Sporting Event may not necessarily have a plot that needs to be remembered in order to return viewing without missing something that may be needed to understand current happenings. Rather, any events of interest in such instances may correspond to highlights within the respective media or content.

Column 2 of Table 3 includes a Threshold B of 24 minutes. Threshold B may correspond to the example second non-zero time threshold value of 24 minutes as discussed above in connection with at least FIG. 4. Similar to Threshold A, Threshold B may be a configurable value that may be defined based on, for example, type of recorded content or media. For example, a time threshold value of 24 minutes may be used when an associated type of recorded content or media is a movie. In another example, a time threshold value of 10 minutes may be used when an associated type of recorded content or media is a Syndicated Show. The Threshold B may be defined to be a lesser value in this instance since a Syndicated Show may typically be of much shorter duration in comparison to a movie such as 1 hour or 30 minutes, for example, and a threshold value on the order of the length of a program may not be the most convenient choice. In example embodiments, both Threshold A and Threshold B may be manually defined, or automatically defined, based on type of recorded content or media for example. Other embodiments are possible.

Column 3 of Table 3 includes a Resume Point of 70 minutes. The Resume Point may correspond to an example time within the Movie at which a previous session of viewing of the Movie has ended. In this example, the Resume Point is defined as 70 minutes, meaning that viewing of the Movie at a prior viewing session was stopped at 70 minutes into the Movie. In general, the PTR 110 and/or the EFM module 122 may be configured to at least monitor start/stop commands related to the output of the Movie to the television 114c for example. In this manner, the Resume Point is always known and may always be up-to-date.

Column 4 of Table 3 may include data that corresponds to or represents the storyline summary of Movie discussed above in connection with at least FIG. 4. For example, although not necessarily drawn to scale when compared to the example timeline 500 of FIG. 5, the first entry in column 4 of Table 3 may be accessed by the EFM module 122 so that the PTR 110 may playback a 1 minute clip, referred to as Event $E_1$, of the Movie starting from 5 minutes into the Movie as measured from the beginning of the Movie until 6 minutes into the Movie as measured from the beginning of the Movie. Additionally, the second entry in column 4 of Table 3 may be accessed by the EFM module 122 so that the PTR 110 may playback a 1.5 minute clip of the Movie starting from 10.5 minutes into the Movie as measured from the beginning of the Movie until 12 minutes into the Movie as measured from the beginning of the Movie. In example embodiments, the PTR 110 may playback consecutive clips of the Movie until after a last clip before the Resume Point is played, and then the PTR 110 may playback the Movie starting from the Resume Point until completion if desired. In the present example, this may correspond to Events $E_1$-$E_3$, being consecutively played back, and then following completion of playback of Event $E_3$, playback of the Movie may proceed starting at or about 70 minutes into the Movie. It is contemplated though that many other embodiments are possible.

For example, in one embodiment, during playback of the clip associated with Event $E_2$ a user might decide they would like to proceed with playback of the Movie starting at or during playback of the clip associated with Event $E_2$. In this example, the user may manipulate a pointing device to exit summary playback of Events $E_1$-$E_3$ and enter into a "normal" playback of the Movie, to completion if desired, starting at or during playback of the clip associated with Event $E_2$. In another example, during playback of the clip associated with Event $E_2$ a user might decide they would like to exit summary playback of Events $E_1$-$E_3$ altogether and enter into normal playback of the Movie starting at or about the Resume Point. In this example, the user may manipulate a pointing device to exit summary playback of Events $E_1$-$E_3$ and enter into playback of the Movie to completion if desired starting at or about the Resume Point. In still another example, a "trick" mode may be implemented so that a user may skip back and forth or between Events $E_1$-$E_3$ as desired. For example, during playback of the clip associated with Event $E_1$ a user might decide they would like to access the clip associated with Event $E_3$. In this example, the user may manipulate a pointing device to skip to the clip associated with Event $E_3$ in a manner similar to that of skipping around between chapters of a movie on a DVD. In still another example, it is contemplated that at least a portion of the Events $E_1$-$E_Z$ may be played back in an order that does not match an original movie order if it is some manner determined that the alternate order may create a more coherent and/or succinct movie summary. For example, summary playback of Events $E_1$-$E_Z$ may correspond to E1, E4, E3, E2, etc. Still other embodiments are possible.

It is contemplated that the data that corresponds to or represents the storyline summary of Movie shown in column 4 of Table 3 may be populated therein in a number of different ways. For example, the service provider 102 of FIG. 1 may employ an individual or entity, either internally or third party, to generate the data that corresponds to or represents the storyline summary of Movie. In another example, the service provider 102 of FIG. 1 may pull the data that corresponds to or represents the storyline summary of the Movie from a publicly-accessible or and or non-publicly-accessible database (e.g., for a fee), such as third-party server 120 shown in FIG. 1. In some embodiments, the EFM module 122 may only need to be supplied with timestamp information over a network, so that only a relatively small amount of data is sent/received over a network connection, to create the storyline summary of the Movie. Further, it is contemplated that the service provider 102 of FIG. 1 may provide a mechanism so that its customers could provide feedback about the storyline summary of the Movie. For example, a user may make and submit a comment to the service provider 102 suggesting that an important plot point of the Movie located between Event $E_1$ and Event $E_2$ should be added to the storyline summary so that others may access a more complete storyline summary of the Movie. In this example, the service provider 102 of FIG. 1, or perhaps some other entity, may modify the storyline summary of the Movie so that another Event is defined within the storyline summary between Event $E_1$ and Event $E_2$. Still other embodiments are possible.

The above-described example feature of providing a user an option to address issues that may be experienced when any particular recorded content is watched over a relatively extended period may at least enhance user QoE or QoS. As mentioned above, such a feature may further serve to entice new customers to subscribe to satellite television, audio programming, and/or interactive television services offered by a particular content provider, as well as provide incentive for existing customers to maintain their loyalty and/or relationship with the particular content provider. It is contemplated that there are many other features that may also serve these and other purposes.

Figure 6:
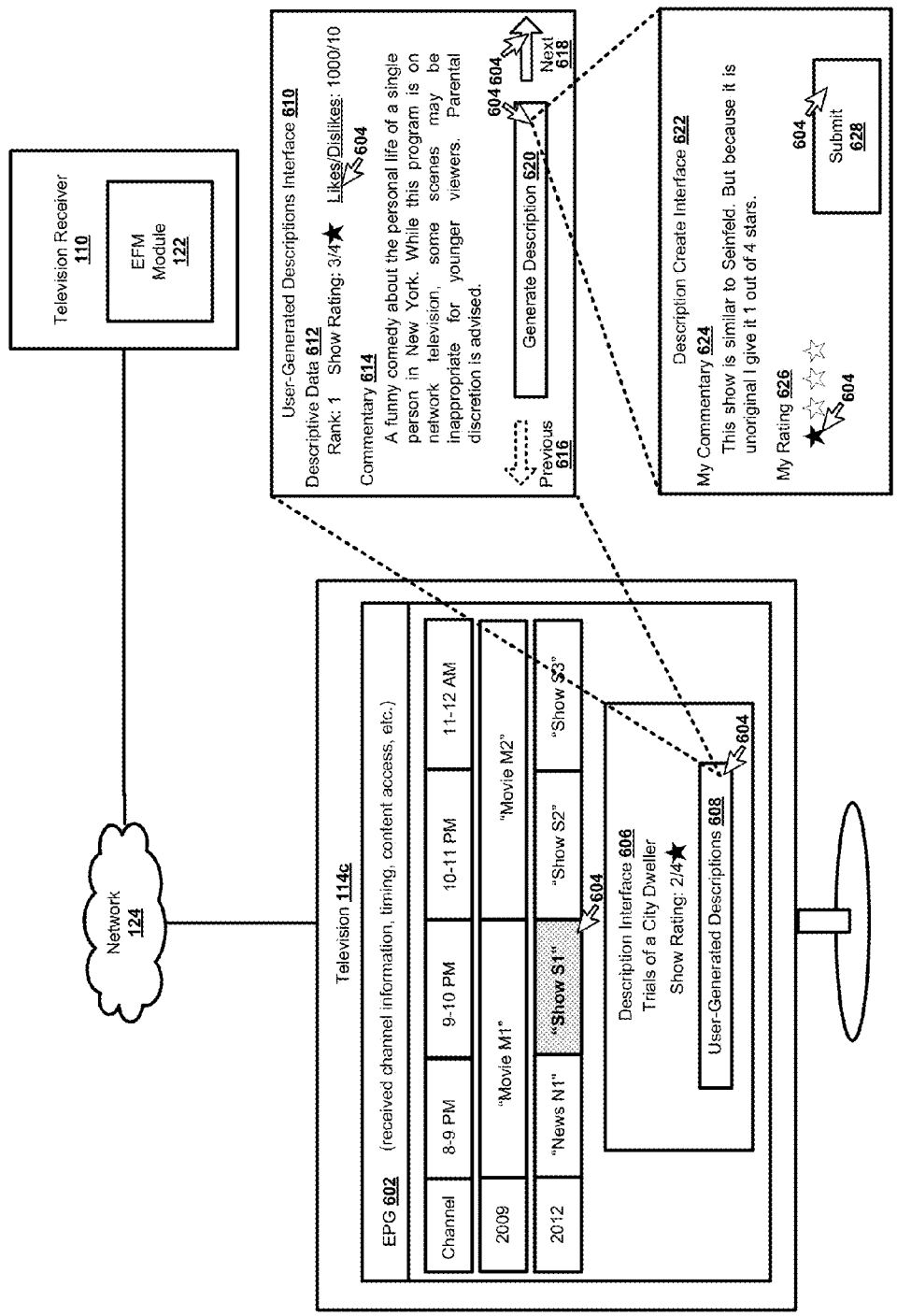
FIG. 6 shows second aspects of the system of FIG. 1 in detail.

For example, referring now to FIG. 6, second aspects of the example system 100 of FIG. 1 are shown in detail. The features of FIG. 6 may be similar to those discussed above in connection with FIG. 3 in a number of ways. For example, the PTR 110 may be configured to output an EPG 602 to and for presentation by at least the television 114c. The EPG 602 may at least present various information related to television channels and the timing of programs or programming appearing on such television channels, such as television channels as received from one or more of the satellites 106a-c. For example, the EPG 602 may display channel information associated with a channel 2012, where a Show S1 is listed as scheduled to appear on the channel 2012 during a particular time period 9-10 PM of a particular day, etc. In this example, and assuming that a current time is sometime during the time period 9-10 PM of a particular day, a user may manipulate a cursor 604 using a pointing device to select (e.g., "double-click") the Show S1 for immediate viewing, indicated by light stipple shading in FIG. 6, on the television 114c. Other embodiments are possible. For example, it is contemplated that any means consistent with menu-driven navigation may be used to interact with the EPG 602, and respective elements of the EPG 602.

The EPG 602 may further display or otherwise present a description interface 606 that may include various information about particular broadcast programming once accessed. For example, just by virtue of navigating to the "button" associated with the Show S1 via any particular menu-driven navigation technique, the description interface 606 may be automatically presented within at least a portion of the EPG 602, and display various information such as year/episode information, actor information, duration information, and etc. The description interface 606 may further include a brief description of the Show S1 such as "Trials of City Dweller," along with a rating "2/4 Stars" for example.

In many instances, the brief description of particular media content presented within an EPG may be insufficient for most people to obtain a grasp of just what the particular media content is about. For example, the description "Trials of City Dweller" associated with the Show S1 is not very descriptive at all. In other examples, the description might contain information that may not be understood by a large part of the population. For example, a description for the movie "Rocky IV" might indicate "Rocky Balboa trains for a fight versus a lab tested fighter with a 2,000 PSI punch." However, not many people may be able to appreciate the power a 2,000 PSI punch packs. Aspects of the present disclosure may address these and other issues that may be experienced when it is found or determined by a television receiver user that the brief description of particular media content presented within an EPG is not enough to allow for the user to obtain a reasonable obtain a grasp of just what the particular media content is about.

For example, referring still to FIG. 6, a user may manipulate the cursor 604 to select a first icon or button 608 to access user-generated descriptions that are associated with the Show S1. The descriptions are "user-generated" because they are provided by customers of a particular content or service provider, and not some other entity such as the content provider or a third party who sells descriptions for programming to the content provider. In response to selection of the button 608, a first interface 610 may be displayed within for example at least a portion the EPG 602 on the television 114c. In general, the first interface 610 may provide various types of information such as descriptive data 612 and commentary 614. In this example, descriptive data 612 may include ranking information, show rating information, and likes/dislikes information.

As discussed further below, the commentary 614 and the show rating information within the descriptive data 612 may be supplied by an individual who created the displayed user-generated description as shown in FIG. 6. The ranking information may be representative of how many people have voted as to whether they approve or disapprove of commentary 614. In FIG. 6, the displayed user-generated description is "Rank: 1" meaning at least that the user-generated description has been approved by more people than other user-generated descriptions. In some embodiments, this may be the reason why the displayed user-generated description is the first or initial description presented within the first interface 610 in response to selection of the button 608. That is, it is the "highest" or "greatest" rated user-generated content. Other embodiments are possible.

It is contemplated that a menu-navigation feature may be implemented so that a user may access other user-generated content. For example, previous/next buttons 616 and 618 may be selected to access other user-generated content. In this example, upon selection of the next button 618, user-generated content of "Rank: 2" may be displayed within the first interface 610 because "Rank: 2" user-generated content may naturally follow "Rank: 1" user-generated content. Other embodiments are possible. In general, users may vote as to whether they approve or disapprove of commentary 614 as shown in FIG. 6 by manipulating the cursor 604 to select a "Likes" link or a "Dislikes" link, as indicated by "underlining" in FIG. 6. The ranking of the displayed user-generated description may then be modified in substantially real-time by the EFM module 122.

As mentioned above, the commentary 614 and the show rating information within the descriptive data 612 may be supplied by an individual who created the displayed user-generated description as shown in FIG. 6. In some embodiments, a user may manipulate the cursor 604 to select a second icon or button 620 presented in this example within the first interface 610 to create new user-generated content or descriptions. For example, in response to selection of the button 620, a second interface 622 may be displayed within for example at least a portion the EPG 602 on the television 114c. In general, the second interface 622 may provide a text entry field 624 and a rating entry field 626 so that a particular user or customer may generated their own user-generated content or description. Following entry of data within the text entry field 624 and the rating entry field 626, the particular user may manipulate the cursor 604 to select a third icon or button 620 to submit user-generated content or description. In some embodiments, the EFM module 122 may forward to the new user-generated content or description to an entity such as the service provider 102 who may review the new user-generated content or description to protect customers from obscene or inappropriate content and then publish the new user-generated content or description when approved. Other embodiments are possible. Further, it will be appreciated that the features discussed above in connection with at least FIG. 6 is or are implementation-specific, and similar features may be implemented in any number of ways.

As discussed throughout, the present disclosure is directed to or towards providing one or more features that together or separately enhance television receiver-related QoE or QoS. At least those described features may serve to entice new customers to subscribe to satellite television, audio programming, and/or interactive television services offered by a particular content provider, as well as provide an incentive for existing customers to maintain their loyalty and/or relationship with the particular content provider. Further, it will be appreciated that the those described features may be implemented in a number of different ways, and a particular implementation may evolve as the underlying technology evolves.

Still further, it is contemplated that other features may flow from aspects of the present disclosure. For example, if an entity has a database of information to create storyline summaries it is contemplated that the entity could also a create a "Movies in a Hurry" product or feature to let or enable someone who has not seen a particular movie before, or possibly who has seen the movie previously but mostly forgotten it, get a relatively quick exposure or crash course to the entire movie. Further, with respect to user-generated EPG content, it is contemplated that part of the uploading of content process may allow a customer to create a User ID that might appear along with their uploaded content, and overall Like/Dislike scores of the User IDs might be tracked. Those customers who have high scores in the community may be that much less likely to cancel their service subscription.

Figure 7:
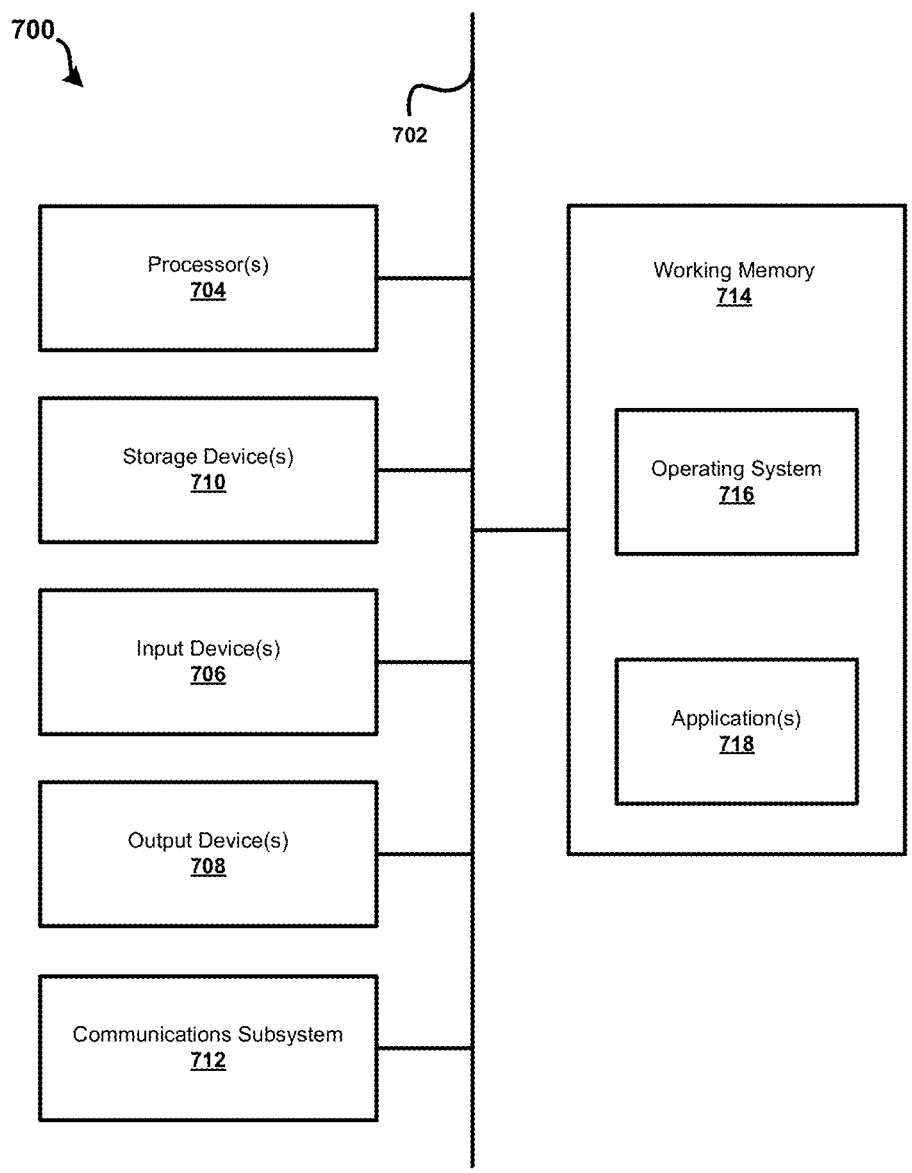
FIG. 7 shows an example computing system or device.

FIG. 7 shows an example computer system or device 700 in accordance with the present disclosure. An example of a computer system or device includes an enterprise server, blade server, desktop computer, laptop computer, tablet computer, personal data assistant, smartphone, gaming console, STB, television receiver, and/or any other type of machine configured for performing calculations. The computer system 700 may be wholly or at least partially incorporated as part of previously-described computing devices, such as the service provider 102, a satellite uplink 104, satellites 106a-c, satellite dish 108, PTR 110, STRs 112a-b, televisions 114a-c, computing devices 116a-b, and servers 118 and 120 of at least FIG. 1. Further, the example computer device 700 may be configured to perform and/or include instructions that, when executed, cause the computer system 700 to perform the method of FIG. 4. Still further, the example computer device 700 may be configured to perform and/or include instructions that, when executed, cause the computer system 700 to instantiate and implement functionality of the EFM module 122 of at least FIG. 1.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless or wired), an infrared communication device, a wireless communication device, and/or a chipset (such as a Bluetooth™ device, an 702.11 device, a WiFi device, a WiMax device, cellular communication facilities (e.g., GSM, WCDMA, LTE, etc.), and/or the like. The communications subsystem 712 may permit data to be exchanged with a network (such as the network described below, to name one example), other computer systems, and/or any other devices described herein. In many embodiments, the computer system 700 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the disclosure. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer may read instructions and/or code.

Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A television receiver, comprising:
   one or more processors; and
   a memory communicatively coupled with and readable by the one or more processors and having stored therein processor-readable instructions that, when executed by the one or more processors, cause the one or more processors to:
   output for presentation by a display device at least one predefined clip of recorded media provided by a content provider when a prior playback of the recorded media has at least exceeded a non-zero time threshold;
   output for presentation by the display device particular content that is separate from but associated with and that describes particular media provided by the content provider, and that is provided by customers of the content provider in place of content that is separate from but associated with and that describes the particular media provided by an entity other than customers of the content provider;
   report to the content provider feedback about the quality of the predefined clip as representative summary information of the recorded media; and
   detect receipt of an indication to access an interface that presents an option for a particular user to provide comments about the particular media.

2. The television receiver of claim 1, wherein the memory having stored therein processor-readable instructions which, when executed by the one or more processors, cause the one or more processors to:
   output the at least one predefined clip when the prior playback of the recorded media has exceeded the non-zero time threshold value and a predetermined period of time has passed since the prior playback of the recorded media; and
   determine whether to modify a rank of the particular content in relation to other customer-provided content based on a received indication of approval or disapproval of the particular content.

3. The television receiver of claim 1, wherein the memory having stored therein processor-readable instructions which, when executed by the one or more processors, cause the one or more processors to:
   access from within a particular file associated with the recorded media from one of a local memory of the television receiver and a delocalized server over a network connection a start time to playback the predefined clip, and a time duration that indicates a total time to playback the predefined clip; and
   detect receipt of an indication to access other particular customer-generated content having an associated ranking greater than or less than a ranking of the particular content.

4. The television receiver of claim 1, wherein the memory having stored therein processor-readable instructions which, when executed by the one or more processors, cause the one or more processors to:
   detect receipt of an indication during playback of the predefined clip to restart playback of the recorded media to completion starting from a time associated with the indication; and
   detect receipt of an input corresponding to approval or disapproval of the particular content.

5. The television receiver of claim 1, wherein the memory having stored therein processor-readable instructions which, when executed by the one or more processors, cause the one or more processors to:
   detect receipt of an indication during playback of the predefined clip to restart playback of the recorded media to completion starting from a time associated with a ceasing of the prior playback of the recorded media; and
   detect receipt of an input corresponding to a rating of the particular media.

6. A computer-implemented method, comprising:
   receiving a request to access recorded media content;
   determining whether a prior playback of the recorded media content has exceeded a particular time threshold value;
   when the prior playback of the recorded media content has at least exceeded the particular time threshold value, and a summary file of the recorded media content is available, outputting for presentation at least one clip of the recorded media content based on information within the summary file, wherein the at least one clip is contained within the recorded media content prior to a time associated with a ceasing of the prior playback of the recorded media content; and
   receiving feedback, based on input from a user, about the quality of the at least one clip as representative summary information of the recorded media content.

7. The method of claim 6, further comprising:
   outputting for presentation the at least one clip when the prior playback of the recorded media content has exceeded the particular time threshold value, and a predetermined period of time has passed since the prior playback of the recorded media content.

8. The method of claim 6, further comprising:
   accessing when available the summary file by a television receiver from one of a local memory of the television receiver and a delocalized server over a network connection.

9. The method of claim 6, further comprising:
   populating the summary file to contain information associated with the at least one clip including a timestamp that indicates a start time to playback the at least one clip, and a time duration that indicates a total time to playback the at least one clip.

10. The method of claim 6, further comprising:
receiving an indication during playback of the at least one clip, based on input from a user, to restart playback of the recorded media content to completion starting from a time associated with the indication.

11. The method of claim 6, further comprising:
receiving an indication during playback of the at least one clip, based on input from a user, to restart in playback of the recorded media content to completion starting from the time associated with the ceasing of the prior playback of the recorded media content.

* * * * *